United States Patent Office 3,522,305
Patented July 28, 1970

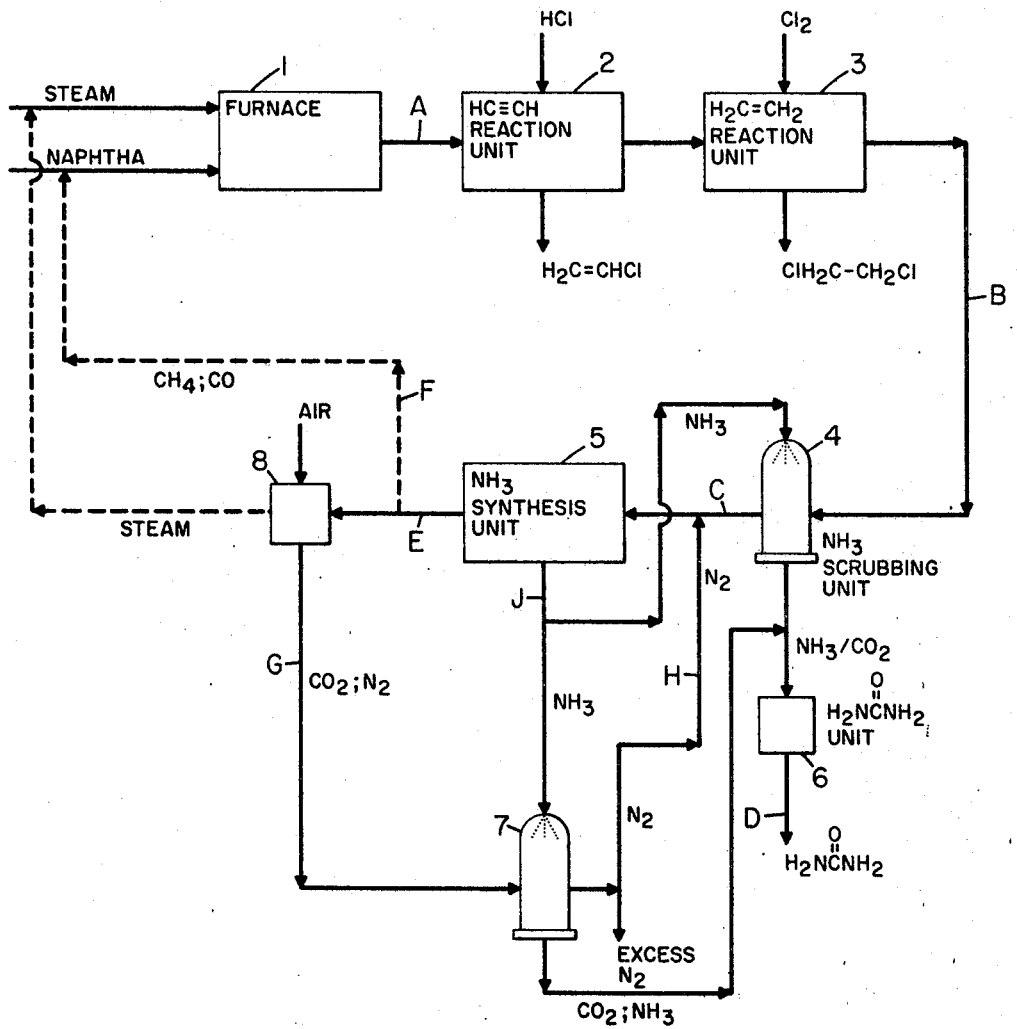

3,522,305
PRODUCTION OF UREA AND DERIVATIVES OF ETHYLENE AND ACETYLENE
Danford H. Olson, Wood River, Ill., assignor to Marathon Oil Company, Findlay, Ohio, a corporation of Ohio
Filed Aug. 1, 1966, Ser. No. 575,913
Int. Cl. C07c 127/00
U.S. Cl. 260—555                                6 Claims

ABSTRACT OF THE DISCLOSURE

The present invention relates to new processes and apparatus for the production of urea and derivatives of ethylene and acetylene, and in particular relates to such processes in which derivatives of ethylene, derivatives of acetylene and urea are all produced from the effluent of a hydrocarbon pyrolysis step.

---

Substantial commercial interest has been shown in a variety of processes for the pyrolysis of hydrocarbons to produce ethylene and acetylene such as the Wulff process and others described in S. A. Miller, chapter 5 of Acetylene—Its Properties, Manufacture and Uses, vol. 1 (1965). Virtually all such processes produce as by products, remaining after the removal of acetylene and ethylene, streams containing substantial amounts of methane, hydrogen, carbon monoxide and carbon dioxide. Commercial processes generally utilize the methane, hydrogen and carbon monoxide as a fuel. In its preferred embodiments the present invention permits the conversion of this by product stream into relatively high valued urea, with air being the only required additional raw material.

The present invention comprises: an integrated process for the manufacture of acetylene derivatives, ethylene derivatives, and urea, comprising in combination the steps of, (a) cracking hydrocarbons in a furnace to produce a furnace effluent stream comprising acetylene, ethylene, methane, hydrogen, carbon dioxide and carbon monoxide; thereafter
(b) contacting said furnace effluent stream with a compound reactive with acetylene under conditions which cause the acetylene to react to form an acetylene derivative readily removable from said furnace effluent,
(c) recovering said acetylene derivative,
(d) contacting the remainder of said furnace effluent stream with a compound reactive with ethylene under conditions which cause substantially all of the ethylene to react to form an ethylene derivative,
(e) recovering said ethylene derivative,
(f) contacting the furnace effluent stream from which ethylene and acetylene have been substantially removed with ammonia to selectively remove carbon dioxide and forming a second stream from said ammonia and carbon dioxide,
(g) feeding said second stream to a urea synthesis unit in which a major portion of said second stream is converted to urea,
(h) recovering the urea thus produced,
(i) feeding the furnace effluent stream from which acetylene, ethylene and carbon dioxide have been substantially removed, to an ammonia synthesis unit in which the nitrogen and hydrogen are substantially converted to ammonia,
(j) recovery of ammonia thus produced,
(k) recycling a portion of the ammonia produced in said ammonia synthesis unit with the carbon dioxide removal step, and, in preferred embodiments:

(1) burning a portion of the methane and carbon monoxide effluent from the ammonia synthesis unit with air to provide a balance of carbon dioxide and nitrogen.

The drawing is a schematic diagram of a preferred embodiment of the present invention.

In the drawing, a vaporized hydrocarbon naphtha (similar to jet fuel of the JP4 type) running approximately 55.7° API gravity and having a hydrogen to carbon mole ratio of about 2.08 is fed to a pyrolysis furnace of the Wulff type 1, together with about three pounds of steam for each pound of naphtha fed. The inlet temperature is roughly 716° C. with an exit temperature of about 1052° C. and a pressure of approximately one-half atmosphere absolute. The residence time averages approximately 0.02 second in the furnace. The effluent from the furnace is conventionally quenched and the furnace effluent stream containing acetylene, ethylene, methane, CO, $CO_2$, $H_2$ and $N_2$ in quantities as shown in Table 1, line A is fed to the acetylene reactor 2. In the acetylene reactor, acetylene is selectively reacted with hydrogen chloride to form vinyl chloride which is conventionally removed by selective adsorption in a solvent. The vinyl chloride is recovered for use in the manufacture of vinyl chloride plastics or for other purposes.

The substantially acetylene-free effluent from the acetylene reactor is fed to the ethylene reaction unit 3 where it is contacted with chlorine gas to selectively react with ethylene and form dichloroethane. The dichloroethane thus formed is recovered and used for solvent purposes or as a chemical intermediate, e.g. for the manufacture of vinyl chloride. In a particularly preferred embodiment the dichloroethane formed in the ethylene reaction unit is cycled to the acetylene reaction unit to serve as the solvent for the selective absorption of vinyl chloride.

The effluent from the ethylene reaction unit can, if desired, be recycled back through the acetylene and ethylene reaction units in order to remove any remaining acetylene or ethylene. However, once the ethylene and acetylene have been substantially removed, the effluent from the ethylene reaction unit (having the composition shown in Table 1, line B) is fed to the ammonia scrubbing unit 4 where it is contacted with ammonia, preferably liquid, preferably in a high surface area packed column or other device to selectively absorb and/or react the carbon dioxide in the gas stream with ammonia. The effluent gases from the ammonia scrubber are then fed to the ammonia synthesis unit 5 which will be discussed later. The mixture of ammonia with carbon dioxide (which may in certain circumstances be largely in the form of ammonium carbamate) is fed to the urea synthesis unit 6 in which it is conventionally processed and purified to form urea. (See, for example, the general methods described in Faith, Keyes, and Clark, Industrial Chemicals, 3rd ed., 1965, at p. 791.) The urea produced is recovered and utilized for the production of urea formaldehyde plastics, fertilizer purposes or other end uses. In a typical embodiment of the present invention approximately 76.7 pounds of urea will be produced for each one hundred pounds of hydrocarbon fed to the pyrolysis furnace.

Returning now to the effluent gas stream leaving the ammonia scrubbing unit 4 and comprising methane, carbon monoxide, hydrogen, and nitrogen, this stream is adjusted by mixing with the nitrogen stream, preferably coming from a second ammonia scrubbing unit 7, to be discussed later. The resulting stream having the analysis shown in Table 1, line C is then fed to the ammonia synthesis unit 5 in which ammonia is produced conventionally. Ammonia from the ammonia synthesis unit is fed to the two ammonia scrubbing units 4 and 7, and if desired, some quantity of ammonia may be sold for use, e.g. as liquid fertilizer, or further reacted to form other chemical products.

The effluent from the ammonia synthesis unit comprises methane and carbon monoxide and can be utilized as feed material for other chemical processes, e.g. reforming to a methanol synthesis gas, can be burned as fuel, e.g. by combining with the hydrocarbons fed during the heating cycle of the regenerative Wulff process furnace, or alternatively can be fed to any point upstream from the ammonia scrubbing unit 4, e.g. into the pyrolysis furnace inlet or into the inlet of the ammonia scrubbing unit 4.

A portion of the effluent from the ammonia synthesis unit 5 is preferably fed to a burner 8 where it is burned with an oxygen-containing gas, preferably air, to form a stream comprising $CO_2$ and nitrogen. This burner 8 can in some instances, be incorporated as an intgeral part of the Wulff process furnace or other pyrolysis furnace. Alternatively, heat produced by the burning can be conventionally recovered and utilized elsewhere in the process. Steam generated by the combustion in the burner 8 can be preferably recycled back to the pyrolysis furnace 1 or can be otherwise utilized.

The effluent from the burner 8 which comprises $CO_2$ and $N_2$ is fed to a second ammonia scrubbing unit 7 in which it is contacted with ammonia from the ammonia synthesis plant as described for the first ammonia scrubbing unit 4.

The $CO_2/NH_3$ stream (which may be in the form of ammonium carbamate as mentioned previously) is fed to the urea synthesis unit 6 along with the similar effluent from the first ammonia scrubbing unit 4.

The remaining gas stream from the second ammonia scrubbing unit 7 will under normal circumstances, consist of relatively pure nitrogen with minor amounts of other gases. A portion of this stream may be fed to the inlet of the ammonia synthesis unit 5 to maintain the proper nitrogen balance in the feed to the unit. Any excess nitrogen from the ammonia scrubbing unit 7 can be liquified for sale or used as a purge gas, pressurizing fluid, inert atmosphere, or for other purposes.

The above embodiment should be considered to be only illustrative as the process of the present invention is susceptible to a variety of variations and modifications. For example, in some cases, it may be preferable to combine the $NH_3$ scrubbing units 4 and 7; the pyrolysis furnace 1 need not be a Wulff furnace, but may be any of a variety of hydrocarbon pyrolysis methods which produce streams having a composition similar to those listed in line A of Table 1. See for example, U.S. Pats. 2,718,534 and 2,630,461; selective absorption processes such as that described in 2,667,234 may be used for removal of the acetylene or the ethylene; various purification methods may be used such as that of U.S. 2,721,888; the acetylene purification process of 2,726,734; various methods for the separation of diacetylenes from the acetylene, ethylene and other components of the stream may be employed, such as that of U.S. 2,796,951.

TABLE 1.—STREAM COMPOSITIONS
[Pounds/100 pounds of hydrocarbon feed]

| Stream: | $C_2H_2$ | $C_2H_4$ | $CH_4$ | CO | $CO_2$ | $H_2$ | $N_2$ | $CH_4N_2O$ | $NH_3$ |
|---|---|---|---|---|---|---|---|---|---|
| A [1] | 24.9 | 10.9 | 15.2 | 24.4 | 6.5 | 8.2 | 5.7 | | |
| B | | | 15.2 | 24.4 | 6.5 | 8.2 | 5.7 | | |
| C | | | 15.2 | 24.4 | | 8.2 | 38.4 | | |
| D | | | | | | | | 76.7 | |
| E | | | 15.2 | 24.4 | | | | | |
| F | | | 2(5.4) | 2(7.3) | | | | | |
| G | | | | | 53.8 | | 238.6 | | |
| H | | | | | | | 32.7 | | |
| J | | | | | | | | | 46.6 |

[1] Wulff Process effluent per Acetylene, Miller, Academic Press 1965.
[2] Other figures in Table 1 do not reflect recycle of this stream.

What is claimed is:

1. An integrated process for the manufacture of vinyl chloride, dichloroethane, and urea from starting materials consisting essentially of air, hydrocarbons, HCl, chlorine and steam, comprising in combination the steps of
   (a) cracking hydrocarbons having from 6 to about 15 carbon atoms, in the presence of steam and air in a furnace to produce a furnace effluent comprising acetylene, ethylene, methane, hydrogen, carbon dioxide, nitrogen and carbon monoxide; thereafter
   (b) contacting said furnace effluent stream with HCl which causes the acetylene to react with the HCl to form vinyl chloride;
   (c) removing said vinyl chloride;
   (d) contacting the remainder of said furnace effluent stream with chlorine which causes substantially all of the ethylene to react with the chlorine to form dichloroethane;
   (e) removing said dichloroethane;
   (f) contacting the furnace effluent stream from which ethylene and acetylene have been substantially removed with ammonia to selectively remove said carbon dioxide and forming a second stream comprising said ammonia and said carbon dioxide;
   (g) feeding said second stream to a urea synthesis plant in which a major portion of said second stream is converted to urea;
   (h) recovering the urea this produced;
   (i) feeding the furnace effluent stream from which acetylene, ethylene and carbon dioxide have been substantially removed to an ammonia synthesis unit in which the nitrogen and hydrogen are substantially converted to ammonia; and
   (j) removing and recycling at least a portion of said ammonia to the aforementioned carbon dioxide removal step.

2. The process of claim 1 wherein the furnace effluent stream after the removal of acetylene, ethylene, carbon dioxide and ammonia is at least partially recycled back to said furnace.

3. The process of claim 1 wherein the hydrocarbon comprises a major portion of material having from 6 to about 15 carbon atoms.

4. The process of claim 1 wherein the furnace effluent steram after the removal of acetylene, ethylene, carbon dioxide, and ammonia is at least partially recycled back to said furnace to contact with ammonia to form additional quantities of ammonia/carbon dioxide stream.

5. The process of claim 1 wherein at least a portion of the remaining furnace effluent stream from which acetylene, ethylene, carbon dioxide, and ammonia have been substantially removed, is burned with a gas stream comprising oxygen and nitrogen to form a third stream comprising $CO_2$ and nitrogen;

recycling said third stream to contact with ammonia to form additional ammonia/carbon dioxide stream and a separate stream comprising nitrogen;

recycling said additional ammonia/carbon dioxide stream to said urea synthesis unit; and recycling the separate stream comprising nitrogen to said ammonia synthesis unit.

6. The process of claim 5 wherein said burning step also produces steam and wherein at least a portion of said stream is fed to said furnace.

References Cited

UNITED STATES PATENTS

| | | | |
|---|---|---|---|
| 3,349,126 | 10/1967 | Hsu et al. | 260—555 |
| 3,303,215 | 2/1967 | Otsuka et al. | 260—555 |

FOREIGN PATENTS

| | | |
|---|---|---|
| 603,099 | 6/1948 | Great Britain. |
| 248,955 | 12/1963 | Australia. |

OTHER REFERENCES

Gomi: Hydrocarbon Processing, vol. 43, No. 11, November 1964, pp. 165–170.

LEON ZITVER, Primary Examiner

M. W. GLYNN, Assistant Examiner

U.S. Cl. X.R.

260—656, 662

PO-1050
(5/69)

UNITED STATES PATENT OFFICE
CERTIFICATE OF CORRECTION

Patent No. 3,522,305                    Dated    August 1, 1966

Inventor(s)   Danford H. Olson

It is certified that error appears in the above-identified patent and that said Letters Patent are hereby corrected as shown below:

Col. 3  line 36  intgeral           should read     -- integral --

Col. 4  (last heading Table 1) NH   should read     -- $NH_3$ --

Col. 4  line 64  steram             should read     -- stream --

Col. 5  line  8  stream             should read     -- steam --

SIGNED AND
SEALED
DEC 15 1970

(SEAL)
Attest:

Edward M. Fletcher, Jr.                        WILLIAM E. SCHUYLER, JR.
Attesting Officer                              Commissioner of Patents